United States Patent [19]
Aydt et al.

[11] Patent Number: 5,829,821
[45] Date of Patent: *Nov. 3, 1998

[54] FOLDING TOP OF A VEHICLE

[75] Inventors: Matthias Aydt, Eberdingen; Kurt Pfertner, Wimsheim; Peter Thomas, Pforzheim, all of Germany

[73] Assignee: Dr. Ing. h.c.F. Porsche AG, Weissach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 558,080

[22] Filed: Nov. 13, 1995

[30]     Foreign Application Priority Data

Nov. 23, 1994 [DE] Germany .......................... 44 41 666.0

[51] Int. Cl.$^6$ ....................................................... B60J 7/12
[52] U.S. Cl. ................ 296/122; 296/107.08; 296/107.15
[58] Field of Search ..................................... 296/107, 108, 296/116, 121; 290/122

[56]     References Cited

U.S. PATENT DOCUMENTS 3,297,357  1/1967  Adamski ................................. 296/117
5,207,474  5/1993  Licher et al. ........................... 296/107

FOREIGN PATENT DOCUMENTS

| 0521307A1 | 1/1993 | European Pat. Off. . |
| 0 648 630 | 4/1995 | European Pat. Off. . |
| 95114928 | 2/1996 | European Pat. Off. . |
| 2533510 | 3/1984 | France ................................... 296/116 |
| 9315758 U | 2/1994 | Germany . |

*Primary Examiner*—Dennis H. Pedder
*Attorney, Agent, or Firm*—Evenson, McKeown, Edwards & Lenahan, P.L.L.C.

[57]     ABSTRACT

A folding top for a vehicle, particularly a passenger car, consists of a folding top structure and of a folding top covering, the folding top structure including a rigid substantially plate shaped folding top section which extends adjacent to the windshield frame. The plate-shaped folding top section is supported on the adjoining folding top section by way of B-column control arms, which are constructed in one piece. For linking of the dimensionally stable folding top section adjacent to each B-column control arm, a main control arm is arranged whose one end is pivotably connected to the forward folding top section and whose other end is pivotably connected to a lower control lever, each lower control lever connecting the B-column control arm with a main hoop which spans the passenger compartment in a curved manner and is situated behind it.

20 Claims, 8 Drawing Sheets

FOLDING TOP OF A VEHICLE

BACKGROUND AND SUMMARY OF THE INVENTION

This invention relates to a folding top for a vehicle particularly a passenger car, which can be moved from a closed position spanning a passenger compartment to a rear-side deposited position and is composed of a folding top structure and a folding top covering held in position on the folding top structure, the folding top structure, which interacts with folding top bearings mounted on the body side, comprising a dimensionally stable folding top section which extends adjacent to a windshield frame, From German Patent Document DE-GM 93 15 758, a folding top for a vehicle is known which has an approximately U-shaped forward folding top section which is supported on both longitudinal sides on the folding top bearings by way of rearward roof frame parts and main columns as well as additional control arms. Furthermore, the folding top structure comprises several transversely extending hoops.

This arrangement has the disadvantage that, as a result of the three-part construction of the lateral roof frame, an unfavorable course of the sealing exists and that, because of the large number of components of the folding top structure and of the rotating points as well as several transversely extending hoops, the folding top has a high-expenditure construction.

As a result of the U-shaped construction of the forward folding top section, the outer folding top covering rests on the forward folding top section only in sections and the U-shaped folding top section itself has a relatively low stability.

It is an object of the invention to take such measures on a folding top that, while its construction is simple, it has a high stability (torsional resistance) and that a favorable course of the sealing is achieved in the lateral area.

According to the invention, this object is achieved by providing an arrangement wherein the dimensionally stable folding top section is constructed to be approximately plate-shaped and is supported on its two longitudinal sides directly on the adjoining folding top bearing in each case by way of a B-column control arm constructed in one piece, and wherein, for the linking of the dimensionally stable folding top section adjacent to each B-column control arm, a main control arm is arranged whose one end is pivotably connected to the forward folding top section and whose other end is pivotably connected to a lower control lever, each lower control lever connecting the B-column control arm by means of a main hoop which spans the passenger compartment in a curved manner and is disposed behind it.

The principal advantages achieved by means of the invention are that the approximately plate-shaped, dimensionally stable folding top section is supported directly on the folding top bearing by means of a B-column control arm directly on the folding top bearing, whereby the folding top, while its construction is simple, has a high stability and a favorable course of the sealing is obtained in the lateral area.

In addition, because of the two-part construction of the lateral roof frame, a favorable course of the sealing is provided with only one separating point. The plate-shaped, dimensionally stable folding top section has a high torsional resistance and, in addition, there is a large-surface support of the folding top covering on the dimensionally stable folding top section.

Because of the one-piece B-column control arm, the number of hinged connections and of the components is reduced. Only one transversely extending hoop is provided which is formed by the main hoop.

By the linking of the main control arm by means of the lower control lever to the main hoop, it is achieved that, when the folding top cover is folded back between the dimensionally stable folding top section and the main hoop, the folding top cover is not overstretched.

The tensioning hoop, which is pivotally disposed on the main hoop, can be fixed by means of a detent device in its approximately horizontal operating position and in an approximately vertical mounted position permitting an access to the drive assembly.

When the folding top is swivelled back, the forward folding top section forms at least in sections a covering which is disposed in front of the folding top compartment lid.

Other objects, advantages and novel features of the present invention will become apparent from the following detailed description of the invention when considered in conjunction with the accompanying drawings.

DETAILED DESCRIPTION OF THE DRAWINGS

Figure 1:
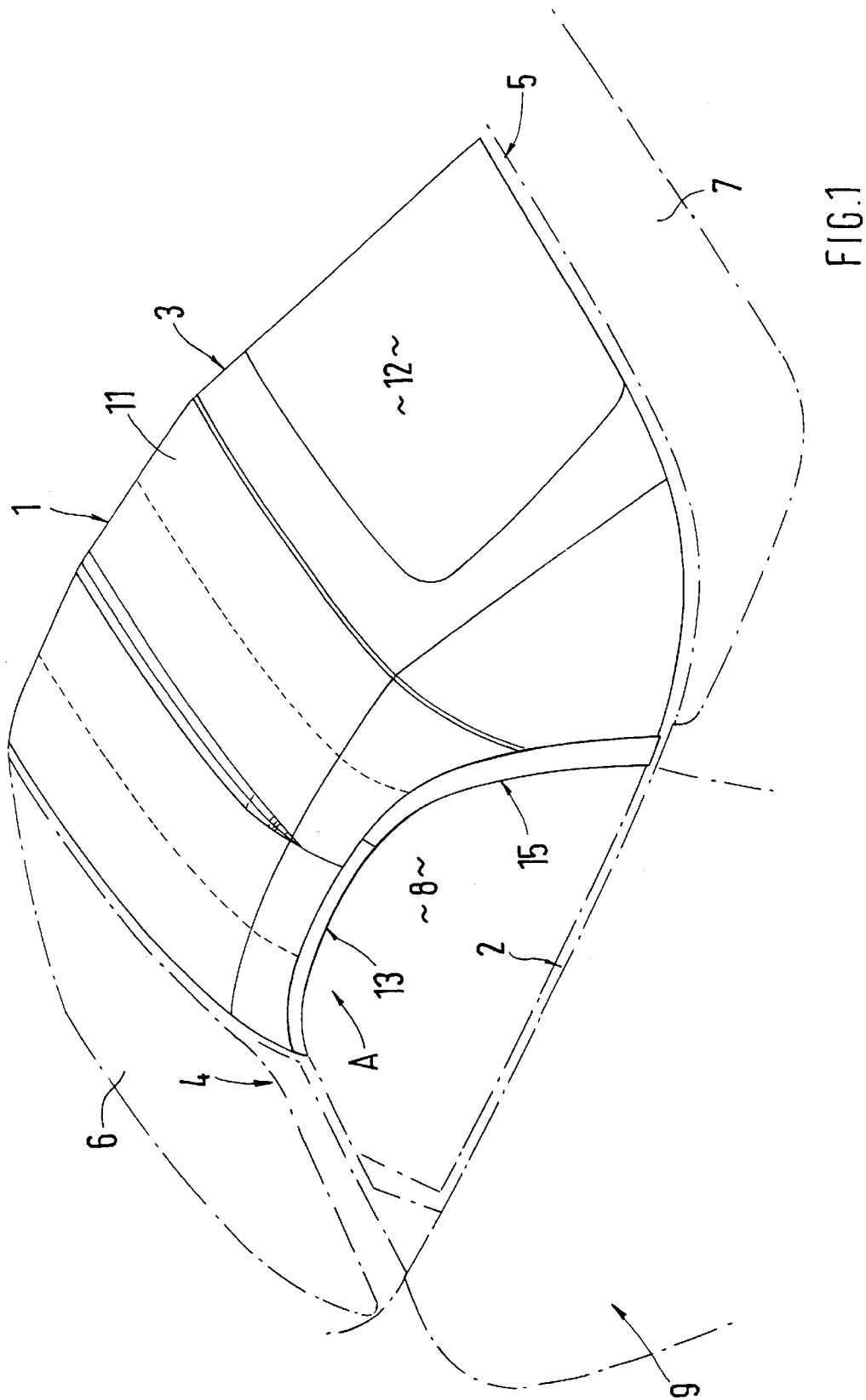
FIG. 1 is a perspective partial schematic view diagonally from the rear of a vehicle having a folding top in the closed position, constructed according to a preferred embodiment of the present invention.
Figure 2:
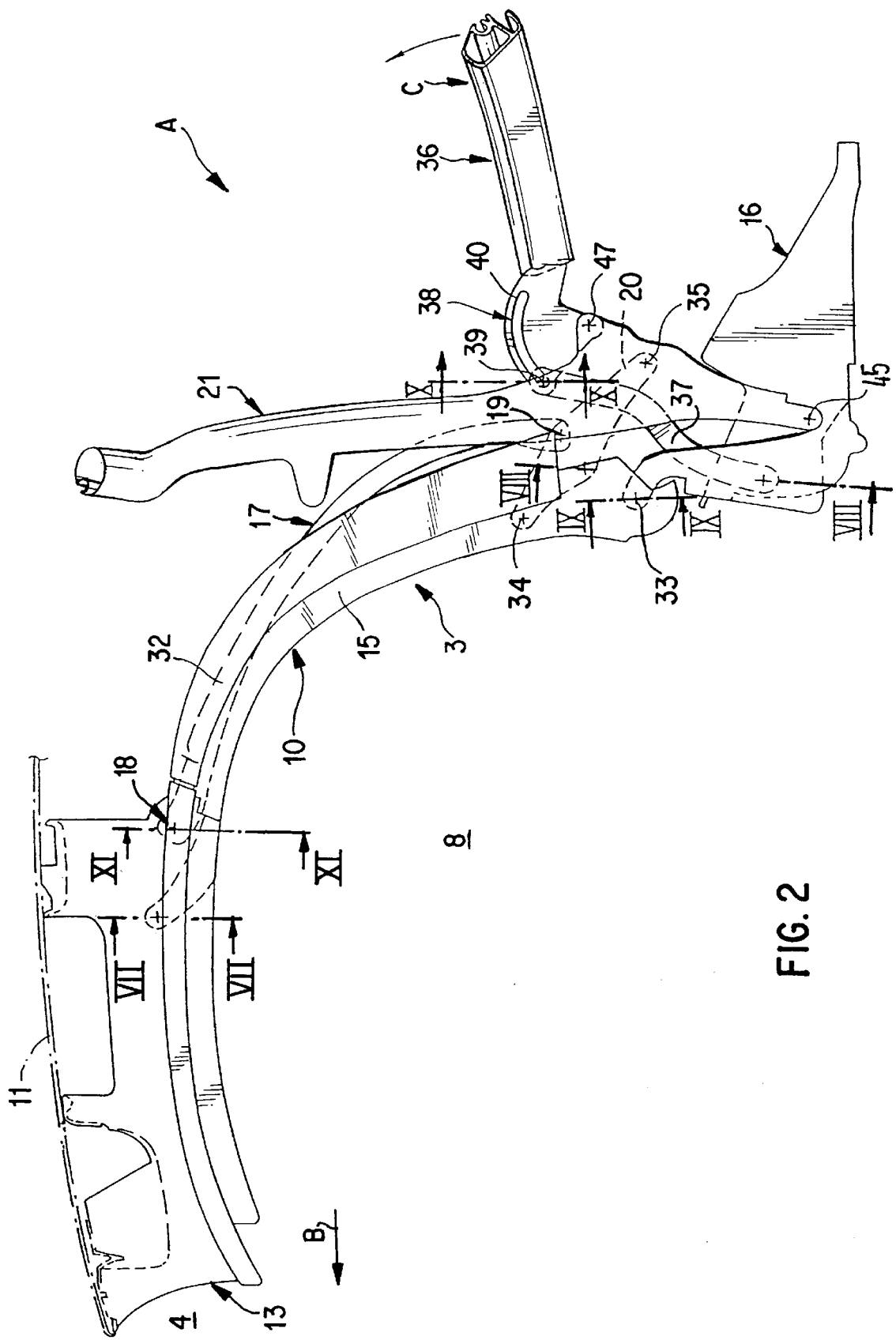
FIG. 2 is a lateral schematic view of the folding top structure of FIG. 1 in the closed position.
Figure 3:
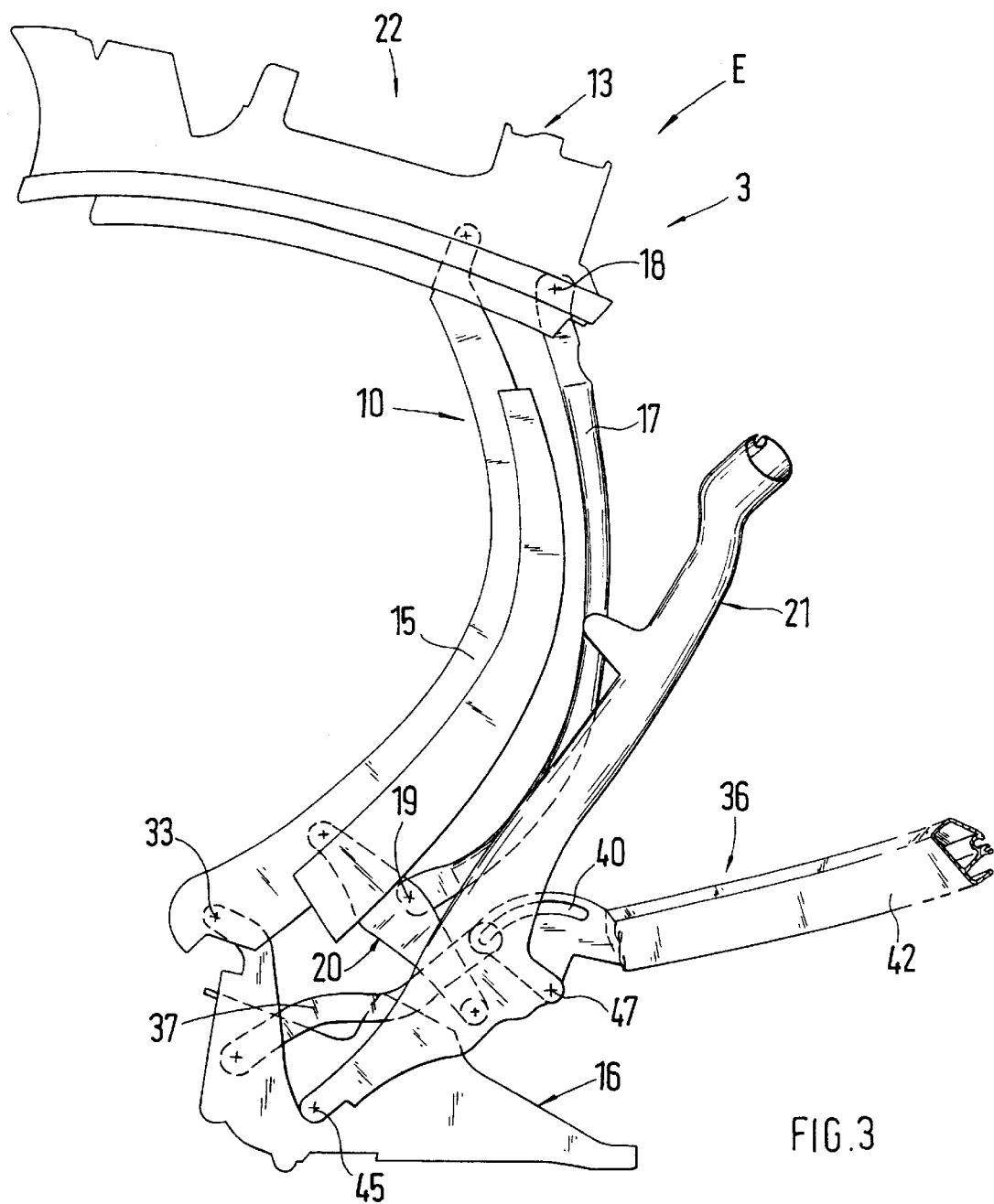
FIG. 3 is a lateral schematic view of the folding top structure of FIG. 1 in a folded-back intermediate position.
Figure 4:
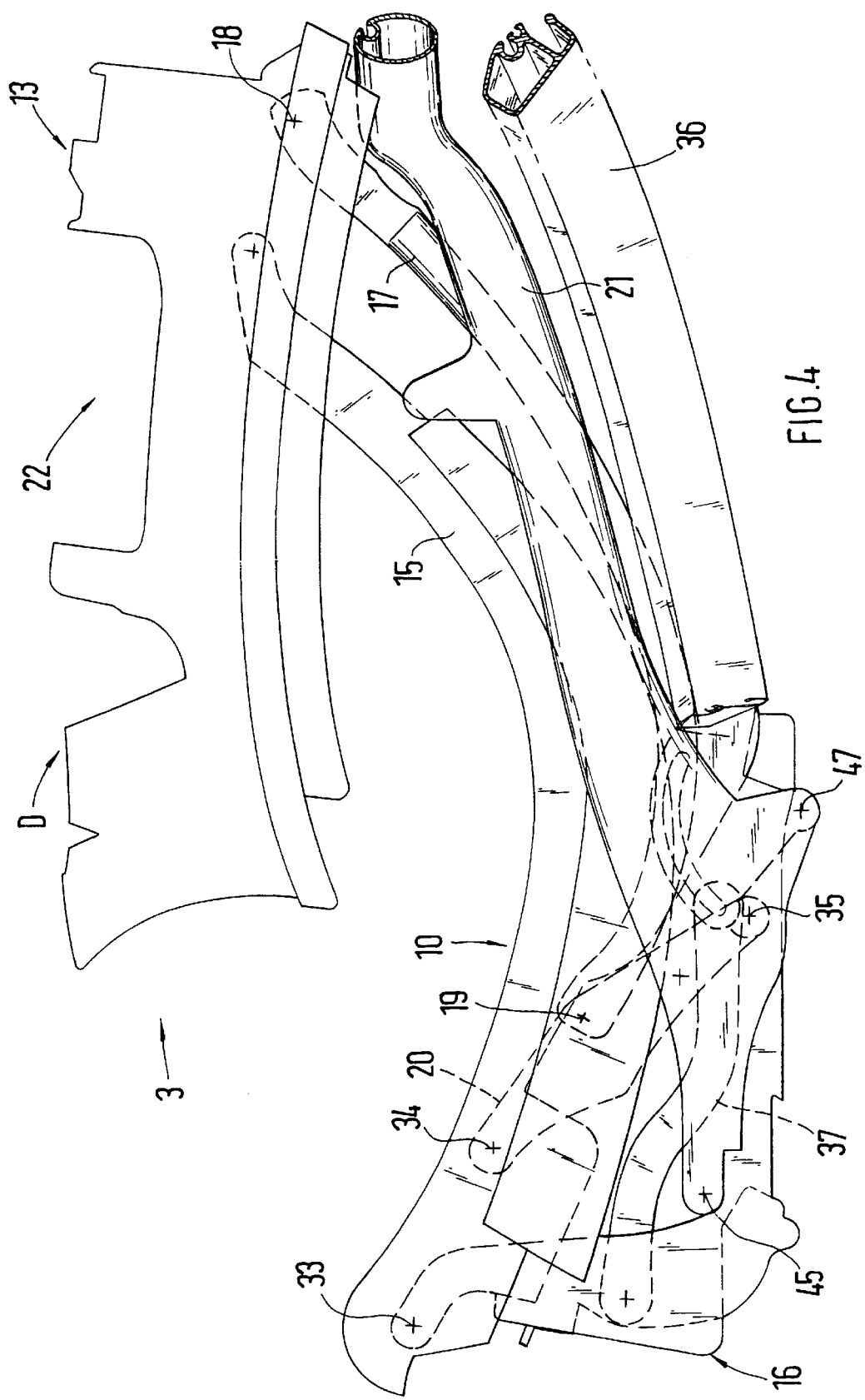
FIG. 4 is a schematic lateral schematic view of the folding top structure of FIG. 1 in a completely folded-back position.

FIG. 1 illustrates a partial area of a passenger car 1 which has a folding top 3 above a belt line 2. In a closed position A, the folding top 3 extends between a windshield frame 4 and a rear area 5. The windshield frame 4 accommodates a windshield 6. In the rear area 5, a pivotable folding top compartment lid 7 is arranged. A passenger compartment 8 of the two-seat passenger car 1 is accessible through side doors 9, the doors 9 being constructed without any frame in an area facing the windshield frame 4 and the folding top 3.

According to FIGS. 2 to 6, the folding top 3 consists of a folding top structure 10 and of a folding top covering 11 held in position on the folding top structure 10. In the rear area of the folding top covering 11, a window 12 is provided which is formed by a flexible or rigid rear window.

The folding top structure 10 comprises essentially a dimensionally stable folding top section 13 which is arranged adjacent to the windshield frame 4, has an approximately plate-shaped construction, and is supported on its two longitudinal sides 14 on the adjoining folding top bearing or bracket 16 in each case by way of a B-column control arm 15 constructed in one piece. For the linking of the dimensionally stable folding top section 13, a main control arm 17 is arranged adjacent to each B-column control arm 15. By means of its one end 18, each main control arm 17 is connected to the forward folding top section 13, whereas the other end 19 is pivotally connected to a lower control lever 20. The lower control lever 20 connects the B-column control arm 15 with a main hoop 21 which spans the passenger compartment 8 in a curved manner and is disposed behind it. The main hoop 21 is rotatably connected with the folding top bearing at reference number 45.

The forward folding top section 13, which is plate-shaped at least in sections, is formed by a diecast part made of a light-metal alloy (such as an aluminum alloy or a magnesium alloy) and, for reasons of weight, has an approximately central recess 22. However, embodiments are also contemplated which do not have such a recess.

In the top view, the folding top section 13 has an approximately rectangular construction, its course in the transverse direction being larger than in the longitudinal direction. The folding top covering 11 is fixed in an almost surrounding manner on the edge sections of the folding top section 13.

Figure 6:
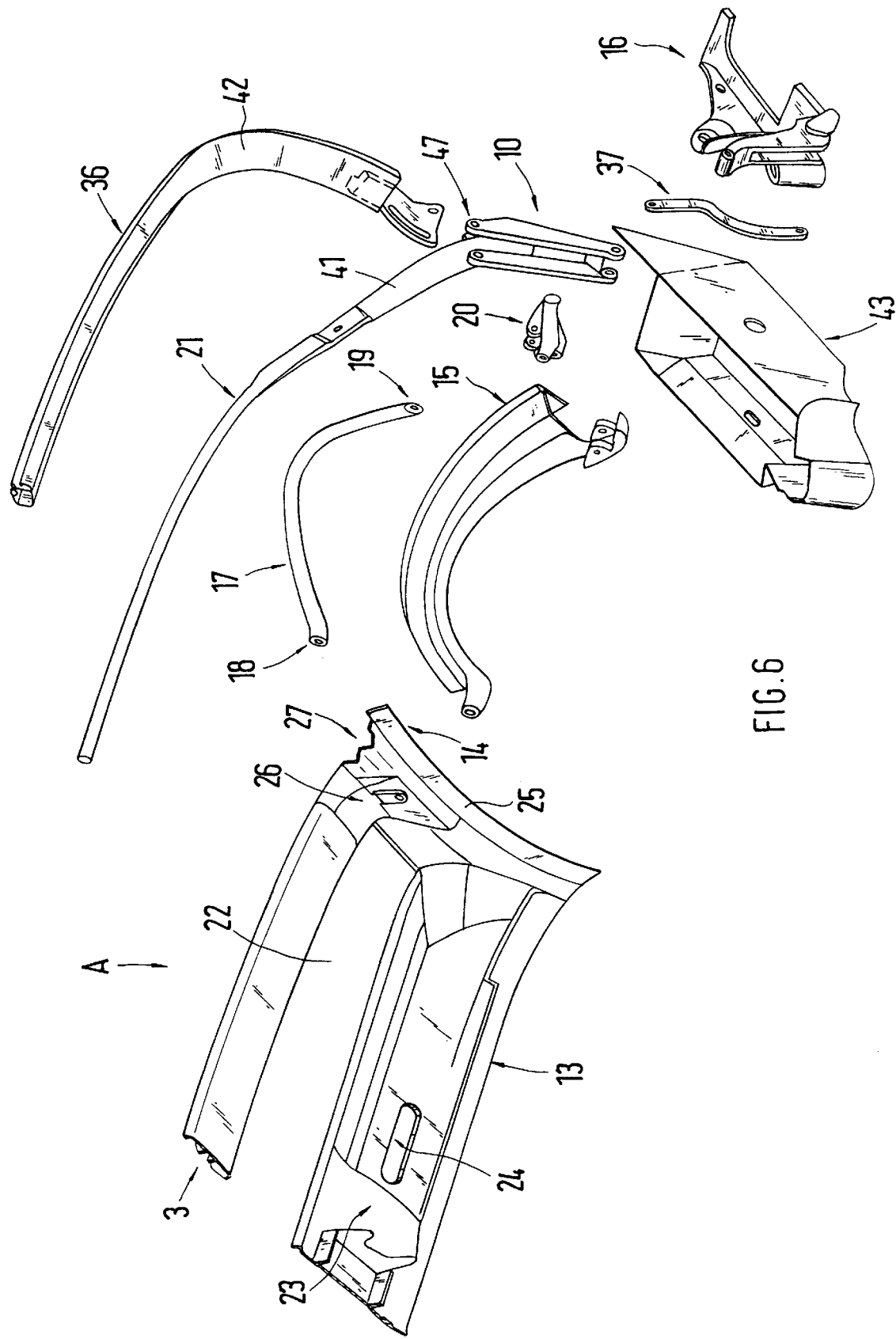
FIG. 6 is an exploded view of important piece parts of the folding top structure of FIG. 1.

In addition, at least one recess-type receiving device 23, which is open toward the top, is constructed on the folding top section 13 for housing a locking device which is not shown. This receiving device 23 is provided adjacent to the windshield frame 4 on the folding top section 13, specifically either in a center area of the transverse course (FIG. 6) or in laterally exterior areas (in the case of two locking devices). In FIG. 6, only one side portion of section 13 is shown. Also, only one side portion of the main hoop 21 and the tensioning bar 36 is shown in FIG. 6.

In the embodiment shown, a central receiving device 23 is provided for housing the locking device. On both sides of the receiving device 23, ring-shaped openings 24 are constructed on the folding top section 13 which are used as a gripping indentation for operating the folding top 13.

On both longitudinal sides 14 of the folding top section 13 (FIGS. 6 and 7), lateral roof frame sections 25 are in each case connected in one piece with the folding top section 13, in which case the folding top covering 11 is fixed on the integrated roof frame sections 25 and sealing bodies are mounted which are not shown in detail. The roof frame sections 25 have a profiled shape.

Figure 7:
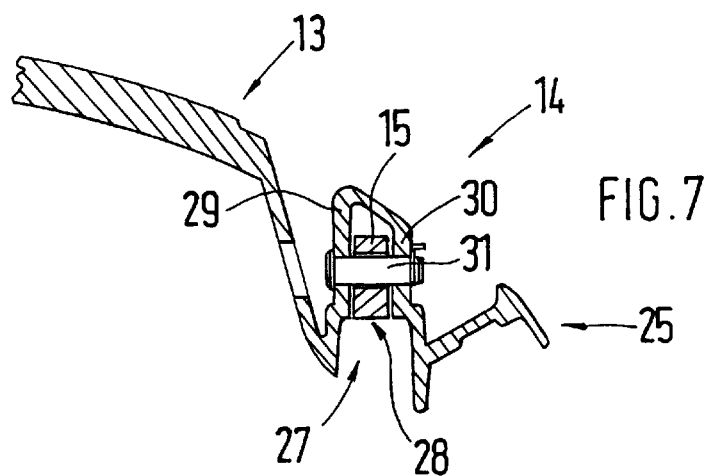
FIG. 7 is an enlarged sectional view taken along Line VII—VII of FIG. 2.
Figure 11:
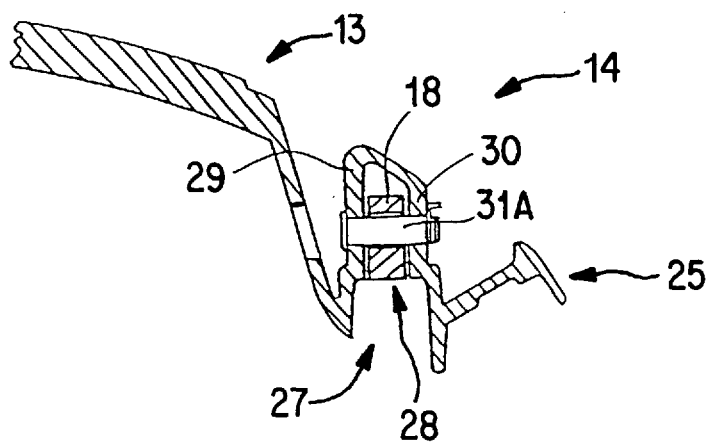
FIG. 11 is an enlarged sectional view taken along Line XI—XI of FIG. 2.

In the two rearward, laterally exterior areas 26 of the folding top section 13, one recess-shaped receiving device 27 respectively is constructed which is open toward the bottom, in which case fork-type bearings 28 are constructed on the receiving device 27 for the forward end of the B-column control arm 15 and of the main control arm 17. (FIG. 7). Between spaced wall sections 29, 30 of the folding top section 13, an end area of the B-column control arm 15 or of the main control arm 17 is introduced, the hinge pin 31 for control arm 15 interacting with the end areas being held in position on the spaced wall sections 29, 30. In a similar manner the hinge pin 31a for the upper end 18 of control arm 17 is supported between the spaced wall sections 29, 30 in a position behind the hinge pin 31, as shown in FIG. 11. The main control arm 17 projects at least in sections into a hollow space 32 of the B-column control arm 15 which is open on one side.

Figure 8:
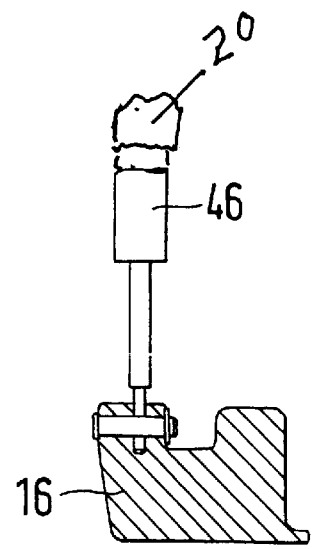
FIG. 8 is an enlarged sectional view taken along Line VIII—VIII of FIG. 2.
Figure 9:
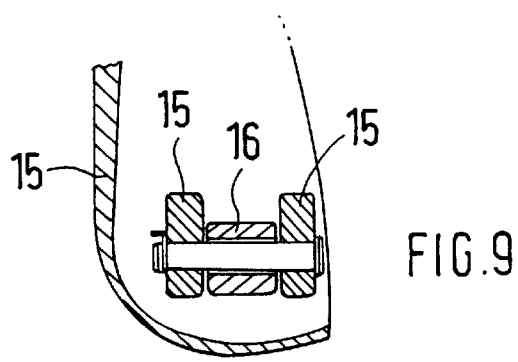
FIG. 9 is an enlarged sectional view taken along Line IX—IX of FIG. 2.

A pneumatic spring 46 is applied at the lower control lever 20 adjacent to the linking point of the main control arm 17, the other end of the pneumatic spring 46 being fixed to the folding top bearing 16 situated below same (compare FIG. 8).

The end points of the B-column control arm 15 and of the adjoining main control arm 17 form a four-bar linkage on each longitudinal side of the folding top 3.

Viewed in the driving direction B, the main control arm 17 is pivotably linked behind the B-column control arm 15 on the forward folding top section 13 and projects at least in sections into a hollow space 32 of the B-column control arm 15 which is open on one side.

Above the lower linking point 33 of the B-column control arm 15, the lower control lever 20 is connected with this B-column control arm 15 at reference number 34. According to FIG. 2, the control lever 20 has a curved shape. The lower end 35 of the control lever 20 is connected to the main hoop 21, specifically approximately at the level of the lower linking point 33 of the B-column control arm 15.

In a central area of the longitudinal course of the lower control lever 20, the lower end 19 of the above-disposed curved main control arm 17 is pivotably connected with the control lever 20.

On the two upright longitudinal sides of the main hoop 21, a rear-side tensioning bow 36 is pivotally disposed above the respective control lever 20 at reference number 47, on which tensioning bow 36 the lower edge of the folding top covering 11 is fixed. The tensioning bow 36 is in an operative connection by way of an additional control arm 37 with the folding top bearing a bracket 16. In addition, a detent device 38 is provided which, on the one hand, holds the tensioning bow 36 in an approximately horizontal operative position C and, on the other hand, holds it in an approximately upright mounted position which is not shown.

In the mounted position, an access is permitted to a drive assembly which is situated under the folding top compartment and is not shown in detail.

Figure 10:
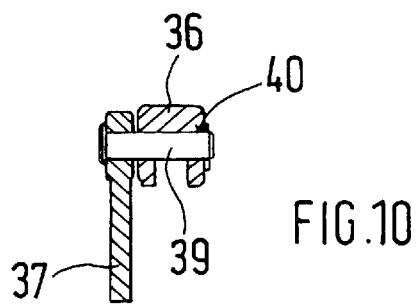
FIG. 10 is an enlarged sectional view taken along Line X—X of FIG. 2.

The detent device 38 comprises a laterally projecting pin 39 which is arranged on an upper end of the control arm 37 and is in an operative connection with a bent slot-shaped guideway 40 of the tensioning bow (FIG. 10).

Below the guideway 40, a spring elements is provided which is not shown in detail, is provided with catches, interacts with the pin 39 and holds this pin in the two end positions.

The forward folding top section 13, the two B-column control arms 15, the two folding top bearings or brackets 16 and at least lateral, upright sections 41 of the multi-part main hoop 21 are formed by diecast parts made from a light-metal alloy (such as an aluminum or magnesium alloy). The tensioning bow 36 consists at least along an essential part of its longitudinal course of a bent extruded profile 42.

Water collecting containers 43 are provided on the lower edge of the folding top structure 10 and are held in position adjacent to the folding top bearings on the body side.

Figure 5:
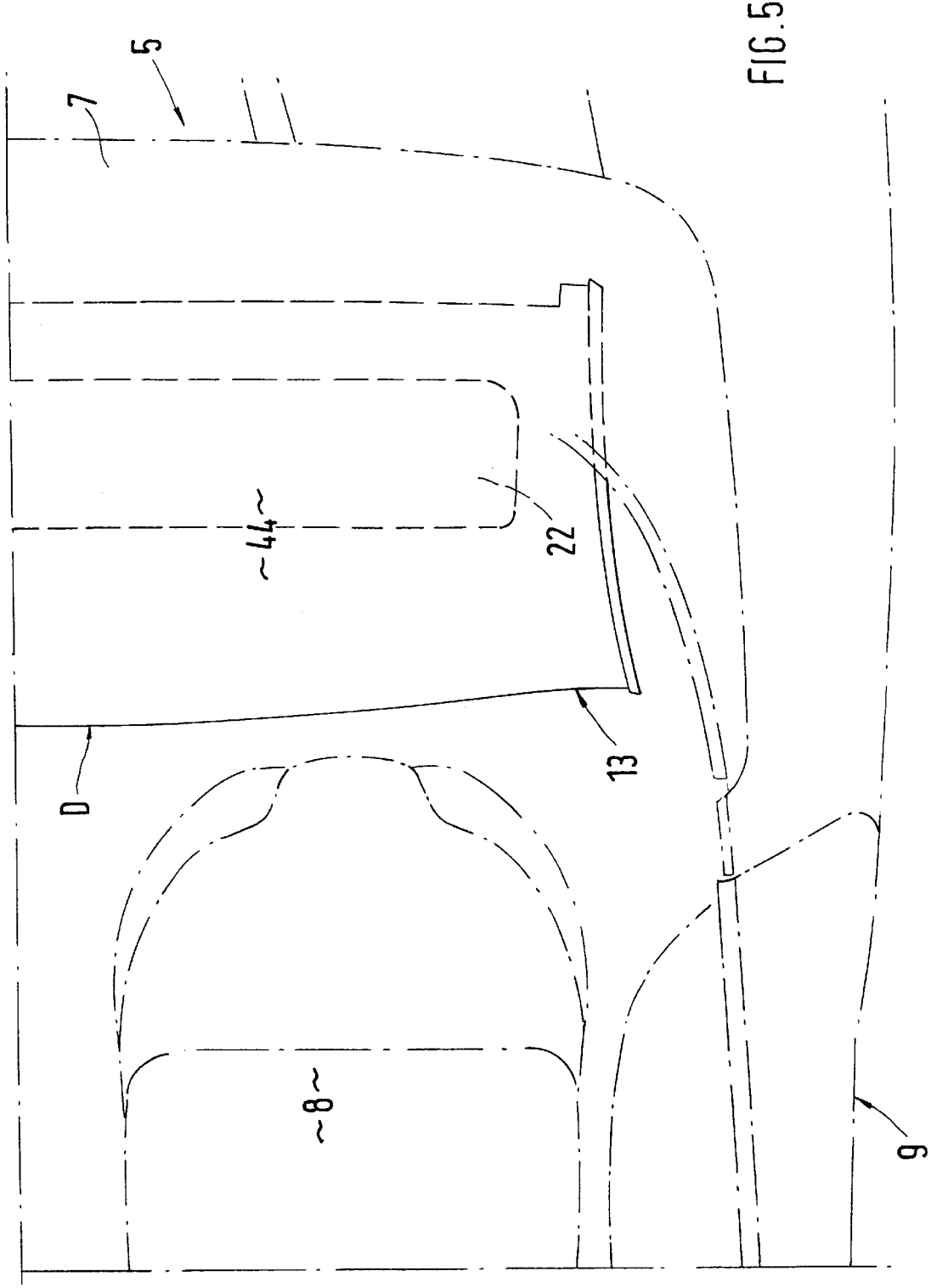
FIG. 5 is a schematic top view of the folded-back position of the folding top and the adjoining structure of the folding top structure of FIG. 1.

In the folded-back position D, the forward folding top section 13 forms at least in sections a covering 44 which is disposed in front of the folding top compartment lid 7 (FIG. 5).

Laterally exterior sections of the forward folding top section 13 and of the B-column control arm 15 form visible shell sections of the folding top 3 (FIG. 1).

The side of the forward folding top section 13 facing the passenger compartment 8 and of the B-column control arm 15 are designed such that they form the visible interior side; that is, the forward folding top section 13 has no interior headlining and the B-column control arm 15 is provided with no additional covering.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top assembly for a passenger car including:
   a dimensionally stable forward folding top section which extends rearwardly from adjacent a passenger car windshield and above a passenger compartment when in an in use closed top position on a passenger car,
   a main hoop which extends laterally across and above said passenger compartment behind the forward folding top section when in the in use closed top position, and
   folding top support structure which in use facilitates movement of the forward folding top section between said closed top position to an open top stowed position in a rear portion of the passenger car,
   wherein said folding top support structure includes a one piece B-column control arm, a main control arm, a lower control lever, and a support bracket fixedly attachable to a passenger car body at each lateral side of said forward folding top section,
   wherein each of said B-column control arms extends between and is connected to said forward folding top section and one of said support brackets,
   wherein each of said main control arms has one end pivotably connected to the forward folding top section and an opposite end pivotably connected to one of said lower control levers,
   and wherein each of said lower control levers is connected to said main hoop and one of said B-column control arms.

2. Folding top assembly according to claim 1, wherein said folding top section exhibits downwardly open receiving sections, and
   wherein respective end areas of said B-column control arms and main control arms project into respective ones of said receiving sections and are pivotably connected to said forward folding top section by respective hinge pins in respective ones of said receiving sections.

3. Folding top assembly according to claim 1, wherein said main control arms and said B-column control arms are pivotably connected to the forward folding top section with said B-column control arms connected to the forward folding top section at pivot points located in front of respective connections of the forward folding top section with said main control arms.

4. Folding top assembly according to claim 1, wherein said B-column control arms exhibit rearwardly facing hollow space sections which accommodate portions of said main control arms when the forward folding top section is in the closed top position.

5. Folding top assembly according to claim 1, comprising respective pneumatic springs interposed between the respective support brackets and the respective lower control levers.

6. Folding top assembly according to claim 1, comprising a rear side tensioning bow pivotably supported on the main hoop.

7. Folding top assembly according to claim 6, comprising respective further control arms at each side of the passenger compartment which operatively connect respective end regions of the tensioning bow with respective ones of the support brackets.

8. Folding top assembly according to claim 7, comprising detent members operable to limit end position movements of said tensioning bow.

9. Folding top assembly according to claim 8, wherein the detent members include respective pins arranged at upper ends of the further control arms and slot-shaped guideways in the tensioning bow through which said pins extend.

10. Folding top assembly according to claim 1, wherein said forward folding top section is formed of diecast parts of a light metal alloy.

11. Folding top assembly according to claim 10, wherein said B-column control arms, said support brackets, and lateral upright sections of the main hoop are formed as respective diecast parts of light metal alloy.

12. Folding top assembly according to claim 2, wherein said main control arms and said B-column control arms are pivotably connected to the forward folding top section with said B-column control arms connected to the forward folding top section at pivot points located in front of respective connections of the forward folding top section with said main control arms.

13. Folding top assembly according to claim 12, wherein said B-column control arms exhibit rearwardly facing hollow space sections which accommodate portions of said main control arms when the forward folding top section is in the closed top position.

14. Folding top assembly according to claim 2, comprising a rear side tensioning bow pivotably supported on the main hoop.

15. Folding top assembly according to claim 14, comprising respective further control arms at each side of the passenger compartment which operatively connect respective end regions of the tensioning bow with respective ones of the support brackets.

16. Folding top assembly according to claim 15, wherein said forward folding top section is formed of diecast parts of a light metal alloy.

17. Folding top assembly according to claim 16, wherein said B-column control arms, said support brackets, and lateral upright sections of the main hoop are formed as respective diecast parts of light metal alloy.

18. Folding top assembly according to claim 1, wherein the passenger car has a folding top compartment in its rear area for receiving the folding top and a folding top compartment lid,
   wherein the folding top compartment lid covers only a rearward area of the folding top compartment in the upward direction, and
   wherein, when the folding top is folded back, the forward folding top section covered by a folding top covering covers in the upward direction a partial area of the folding top compartment which is disposed in front of the folding top compartment lid.

19. Folding top assembly according to claim 1, wherein the passenger car has a folding top compartment in its rear area for receiving the folding top and a folding top compartment lid,
   wherein, when the folding top is folded back, the forward folding top section covered by a folding top covering covers in the upward direction a partial area of the folding top compartment.

20. Folding top assembly according to claim 1, wherein said folding top section exhibits downwardly open receiving sections, and
   wherein respective end areas of said B-column control arms project into respective ones of said receiving sections and are pivotably connected to said forward folding top section by respective hinge pins in respective ones of said receiving sections.

* * * * *